United States Patent [19]

LaFontaine

[11] 4,312,754
[45] Jan. 26, 1982

[54] PORTABLE WATER PURIFIER ESPECIALLY FOR DOMESTIC USE

[75] Inventor: Pierre LaFontaine, Tarbes, France

[73] Assignee: SEB S.A., Selongey, France

[21] Appl. No.: 169,207

[22] Filed: Jul. 15, 1980

[30] Foreign Application Priority Data

Jul. 26, 1979 [FR] France ............................. 79 19308

[51] Int. Cl.³ ...................... B01D 25/06; B01D 33/16
[52] U.S. Cl. .................................. 210/267; 210/282; 210/297; 210/315; 210/476
[58] Field of Search ............... 210/267, 297, 315, 332, 210/282, 330, 403, 485, 360.1, 380.1, 324, 338, 390, 398, 482, 476

[56] References Cited

U.S. PATENT DOCUMENTS

| 1,725,618 | 8/1929 | Chappelle | 210/485 |
| 1,767,314 | 6/1930 | Schmitz | 210/338 |
| 3,872,013 | 3/1975 | Nishino et al. | 210/502 |
| 3,996,640 | 12/1976 | Blue et al. | 210/380.1 |
| 4,119,542 | 10/1978 | Yamaoka et al. | 210/380.1 |

FOREIGN PATENT DOCUMENTS 554252 7/1922 France ................... 210/476

Primary Examiner—Benoît Castel
Attorney, Agent, or Firm—Young & Thompson

[57] ABSTRACT

The portable water purifier comprises a rotary filtering vessel which is surrounded by a compartment designed to collect the water filtered through the lateral wall of the filtering vessel, this vessel being rotatably mounted on its axis of revolution. It also comprises a rotary drive member whose output shaft is made fastened to the rotary filtering vessel and a flow pipe for the filtered water which communicates with the outside and with the bottom of the compartment for collecting the filtered water, and a container for the water to be filtered including means enabling the water to be passed into the rotary vessel.

9 Claims, 6 Drawing Figures

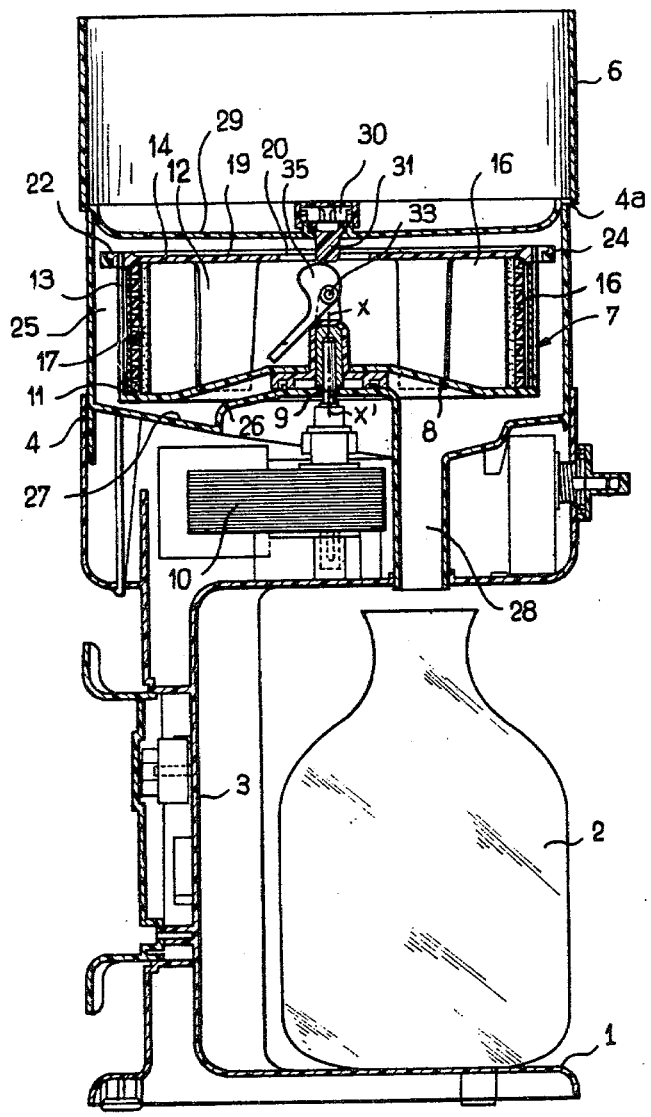
FIG_1

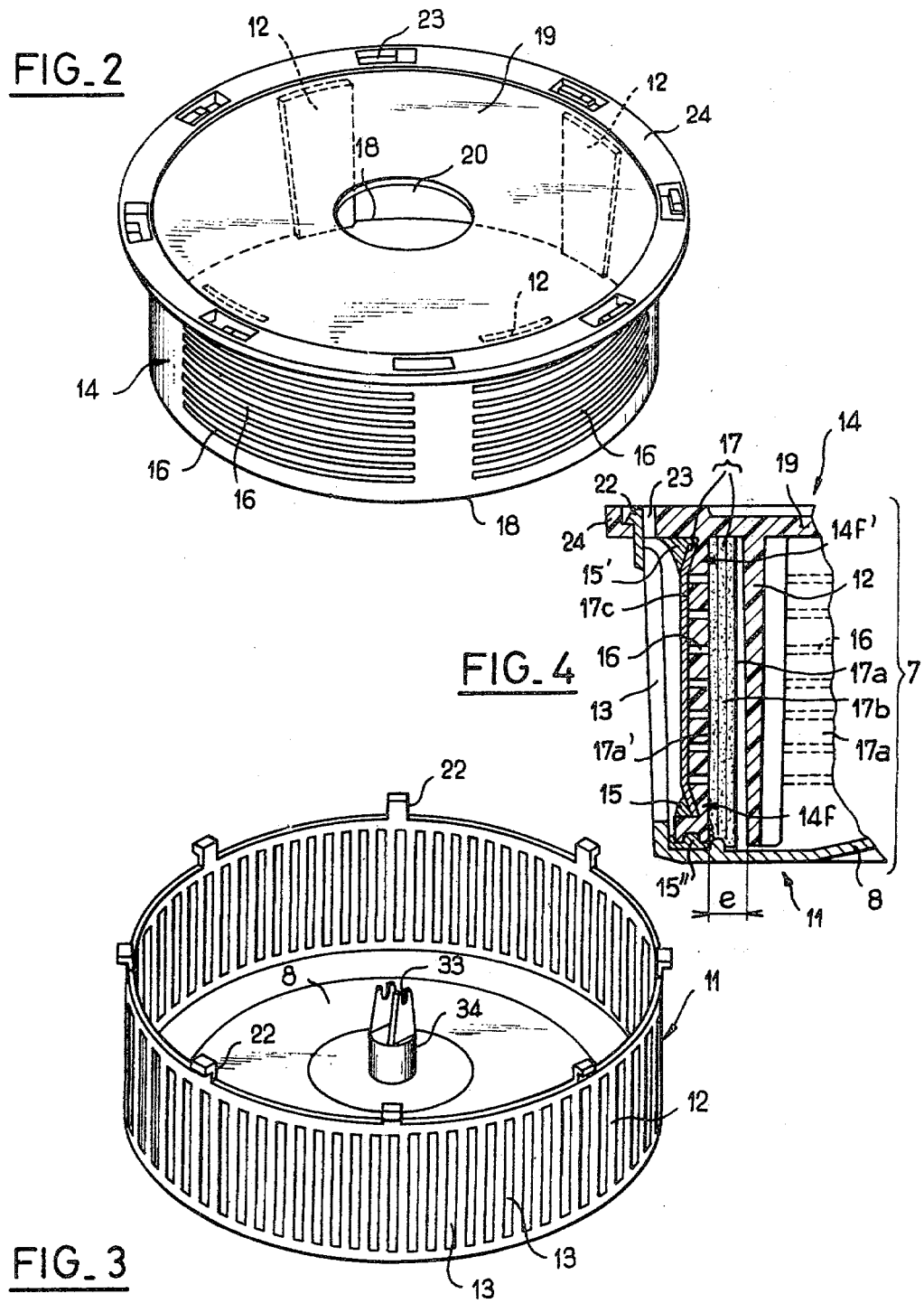

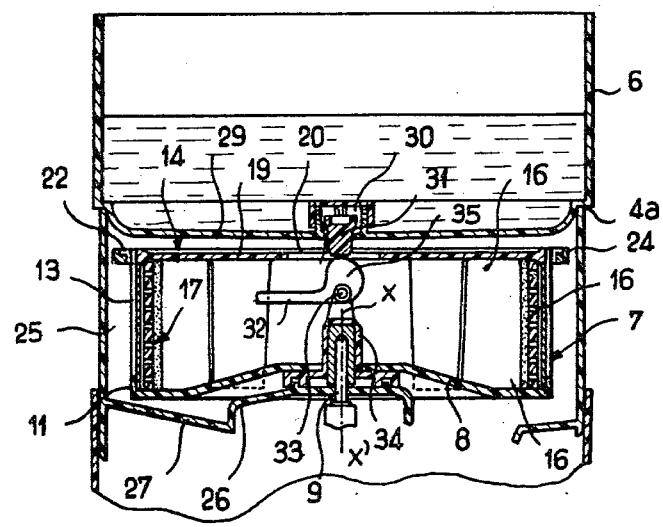
FIG_5
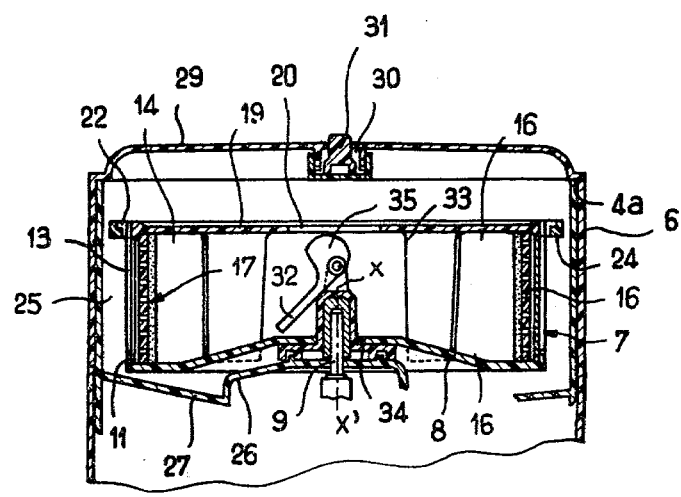
FIG_6

PORTABLE WATER PURIFIER ESPECIALLY FOR DOMESTIC USE

BACKGROUND AND GENERAL DESCRIPTION OF THE INVENTION

The present invention relates to a portable water purifier, especially for domestic use.

The purifier provided by the invention is designed to purify domestic running water, especially removing from it its sometimes unpleasant taste, arising from the addition of chlorine (sodium hypochlorite or Javel water) or from the decomposition of various organic materials.

Portable water purifiers of this type are already known. In these known water purifiers, the water contained in a storage container is circulated through an active charcoal based filter, by means of a pump. The filtered water then flows into a water collecting receiver.

After filtration, the filter of these devices remains soaked with water. The presence of water in the filter creates a medium favorable to the proliferation in situ of micro-organisms which are then capable of passing into the filtered water. In addition, these devices include upstream and downstream of the filter, a water circuit which is difficult to empty completely and, consequently, capable of polluting the water introduced subsequently into these devices.

It is an object of the present invention to overcome the drawbacks of these known devices. It is another object of the invention to provide a water purifier of simple construction and ensuring rapid and efficient filtration of the water, particularly by removing from the latter bacteria or other micro-organisms capable of affecting the quality of the potable water.

According to the invention, there is provided a water purifier characterised in that it comprises a housing including:

a rotary filtering vessel which is surrounded by a compartment designed to collect the water filtered through the lateral wall of the filtering vessel, this vessel being mounted rotatably on its axis of revolution;

a rotary drive member whose output shaft is rendered fastened to the rotary filtering vessel and a filtered water flow pipe which communicates with the outside and with the bottom of the compartment designed to collect the filtered water;

a container for the water to be filtered including means enabling the water to be passed into the rotary vessel.

Filtration by centrifugation has already been used in industry to free a liquid from solid suspended particles, but not for purifying running water available to the public.

In the water purifier according to the invention, the filtration by centrifugation enables filters with pores of very small size to be utilized, so that it is possible to free the water from micro-organisms such as bacteria. In addition, the filtration of the water by centrifugation necessitates rotary drive means of very much lower power, which is advantageous in the case of an apparatus for domestic use.

In addition, after centrifugation and exhaustion of the water to be filtered, the filter is substantially dry. The proliferation of micro-organisms retained in the filter is prevented. Other features and advantages of the invention will also appear in the description which follows.

BRIEF DESCRIPTION OF THE DRAWINGS

In the accompanying drawings relating to particular embodiments given by way of nonlimiting examples:

FIG. 1 is a longitudinal section of an embodiment of a purifier according to the invention;

FIG. 2 is a perspective view of one of the baskets of the centrifugation vessel;

FIG. 3 is a perspective view of the other basket of this vessel;

FIG. 4 is a sectional view, on a larger scale, of a portion of the filtering wall of the vessel;

FIG. 5 is a view in longitudinal section of the upper portion of the purifier according to the invention, the latter being in the course of operation; and FIG. 6 is a similar view to that of FIG. 5, the container for the water to be filtered being in "cover" position.

DESCRIPTION OF PARTICULAR EMBODIMENTS

In the embodiment of FIG. 1, the portable water purifier for domestic use comprises a base 1 on which is placed a flask 2 for containing purified water. This base 1 is surmounted by a foot 3 carrying a housing 4.

On the housing 4 is placed an open container 6 for holding the water to be purified.

The housing 4 encloses at its upper part a filtering vessel 7, rotatably mounted on its axis of rotation XX'. The closed bottom 8 of this vessel is made fastened to the output shaft 9 of an electric motor 10 placed at the lower part of the housing 4.

In the example shown, the filtering vessel 7 comprises (see FIGS. 3 and 4) a first cylindrical basket 11 whose lateral wall includes vertical slots 13 distributed regularly around this wall.

In this basket 11 is nested, as shown in FIG. 1, a second basket 14 (see FIGS. 2 and 4) whose lateral wall includes horizontal slots 16. This second basket includes, opposite its open base 18, a wall 19 having a central opening 20 for the introduction of the water to be filtered held in the container 6. This wall 19 includes, in addition, tongues 12 extending parallel to the wall, and forming between them and said wall a certain space e. In this space e is housed a filtering element comprising preferably three sheets of filter paper 17b impregnated with particles of active charcoal filled with 1% by weight of silver, inserted between two sheets 17a, 17a' of nonwoven synthetic fibers, constituting a coarse pre-filter.

On the outer surface of the wall of the second basket is fixed a filtering diaphragm composed of a layer of acrylonitrile and polyvinyl chloride copolymer 17c deposited on polyamide fabric constituting a mechanical support for said layer 17c. The assembly of layer 17a, 17b and 17c constitutes the filter 17. Fixation is obtained by hot welding of the polyamide fabric on the constituent material of the basket 14, in the zones 14f and 14f'. Threads of glue 15 and 15' are then deposited in these weld zones. The two walls are assembled by nesting. A thread of glue 15" is deposited between the bottom of the first basket 11 and the free edge of the second basket 14.

In addition, the upper edge of the basket 11 comprises locking tabs 22 retainable by openings 23 formed in a collar 24 arranged on the upper edge of the cartridge 14. These locking tabs 22 and these openings 23 render the first basket 11 mechanically fastened to the second basket 14, during the time of drying of the glue thread 15''.

As indicated in FIG. 1, the filtration vessel 7, is composed by two baskets 11 and 14 assembled together, surrounded by an annular compartment 25 bounded by the lateral wall of the housing 4, capable of collecting the water filtered through filtering layers 17a, 17b, 17c.

The bottom 26 of this annular compartment 25 includes a peripheral trench 27 enabling the flow of the filtered water to a vertical pipe 28 for removing the water, which opens outside of the housing 4, in line with the carafe 2 for collecting the purified water.

The container 6 for the water to be filtered rests on the upper edge 4a of this housing, the bottom 29 of the container 6 thus forming the upper part of the compartment 25 for collecting the filtered water.

The bottom 29 of the container 6 includes a central water flow orifice 30 placed facing the water inlet opening 20 in the filtering vessel 7. This water flow orifice 30 includes a valve 31 which closes this orifice 30 when this apparatus is inactive as shown in FIG. 1.

This valve 31 is associated with means enabling its automatic opening when the filtering vessel 7 is rotated by the motor 10. These means comprise, inside the filtering vessel, an arm 32 forming a weight, hinged at 33, at one end on a axial projection 34 of the bottom 8 of the first filtering basket 11. The free end of the arm 32 is directed towards the bottom of the basket 11, when the apparatus is inactive as indicated in FIG. 1. The end of the arm 32 adjacent to the projection 34 includes a cam 35 which is capable of lifting the valve 31 when this arm 32 is brought into horizontal position, under the action of the centrifugal force resulting from the rotation of the basket 11 (see FIG. 5).

In the storage position of the apparatus, the empty container 6 is turned over onto the housing 4, in the manner of a cover, as indicated in FIG. 6.

The operation of the water purifier which has just been described will now be given in detail.

On the first use of the water purifier, the filtering vessel 7 is fastened to the drive-shaft 9.

On the housing 4 is placed the container 6 filled with the water to be purified. In this position, the valve 31 closes the orifice 30 from the container 6, the arm 32 bearing the cam 35 being in the position shown in FIG. 1.

To purify the water held in the container 6, it suffices to start the electric motor 10. The filtering vessel 7 is rotated at a speed comprised between 2000 and 3000 rpm. Under the effect of centrifugal force, the arm 32 is brought into horizontal position as indicated in FIG. 5, and the cam 35 lifts the valve 31.

The water is then admitted into the filtering vessel 7. Under the effect of the centrifugal force, the water is filtered through the filter 17 successively traversing the layers 17a, 17b, 17c.

The layer 17a constitutes a pre-filter to retain the coarse particles retained in the water whilst the second layer 17a' is designed to retain the active charcoal particles which can be detached from the paper sheet 17b. The active charcoal contained in these paper sheets 17b removes from the water its bad taste caused by the chlorinated products and the organic substances in decomposition.

For current domestic use, when the water delivered by the public mains is utilized, the average dimension of the micro-pores represented by the layer 17c may be of the order of 0.45 micron.

When it is desired to use river or lake water directly, it is necessary to use microporosities of the order of 0.22 micron in order to arrest all the micro-organisms which can be found in these waters.

The filtered water is collected in the annular compartment 25 which surrounds the filtering vessel 7, then flows into the carafe 2, passing through the evacuation pipe 28.

When the whole of the water has been filtered, the filter 17 contains practically no more water. The bacteria or the micro-organisms contained in the filtering diaphragm 17c thus find themselves in a medium which is practically dry and unfavorable to their proliferation.

The embodiments of the invention in which an exclusive property or privilege is claimed are defined as follows:

1. A portable water purifier, especially for domestic purposes, comprising a housing enclosing at its upper part a rotary filtering vessel having a central inlet opening and a perforated lateral wall bearing filtering layers, an open container for the water to be purified on the top of the housing and having a water outflow orifice in line with the central inlet opening of the filtering vessel, said filtering vessel having a closed bottom fastened to an output shaft on a rotary drive member at the lower part of the housing and an annular compartment surrounding the filtering vessel and bounded by the lateral wall of the housing to collect the water filtered through the filtering layers of said vessel, said annular compartment having a discharge outlet opening for discharging the purified water, said filtering layers comprising at least one layer whose porosity is selected to retain the bacteria contained in the water to be purified, said flow orifice of said container including a valve, and means to open the valve when the vessel is rotated.

2. Purifier according to claim 1, wherein said filtering layers borne by the lateral wall of the filtering vessel comprises in the direction of passage of the water through the filter, a coarse pre-filter, at least one layer of active charcoal, and an outer filtering diaphragm whose porosity is selected to retain the bacteria contained in the water to be purified.

3. Purifier according to claim 2, wherein the active charcoal layer is constituted by paper impregnated with active charcoal.

4. Purifier according to claim 2, wherein the filtering diaphragm has pores whose average dimension is of the order of 0.45 micron.

5. Purifier according to claim 2, wherein the filtering diaphragm has pores whose average dimension is of the order of 0.22 micron.

6. Purifier according to claim 4, wherein the filtering diaphragm is constituted by a layer of acrylonitrile and polyvinyl chloride copolymer deposited on a polyamide cloth.

7. Purifier according to claim 1, wherein the filtering vessel comprises a first cylindrical basket including a perforated lateral wall, in which is permanently seated a second cylindrical basket whose lateral wall is also perforated and carries the filtering layers.

8. Purifier according to claim 1, wherein the container for the water to be filtered is disposed removably on the upper edge of the housing, the bottom of this container closing the upper portion of the filtering vessel and the annular collection compartment for the filtered water.

9. Purifier according to claim 1, wherein said means comprise, inside the filtering vessel, an arm hinged at one end to an axial projection of the bottom of the filtering vessel, the free end of said arm being directed towards the bottom of the vessel when the purifier is inactive, the end of this arm adjacent to the hinge including a cam which can lift the valve when the arm is brought into horizontal position under the effect of the centrifugal force resulting from the rotation of said vessel.

* * * * *